Oct. 10, 1961 L. O. SCHEU, JR., ET AL 3,003,760
TOWEL FOLDING MACHINE
Filed Dec. 23, 1957 5 Sheets-Sheet 1
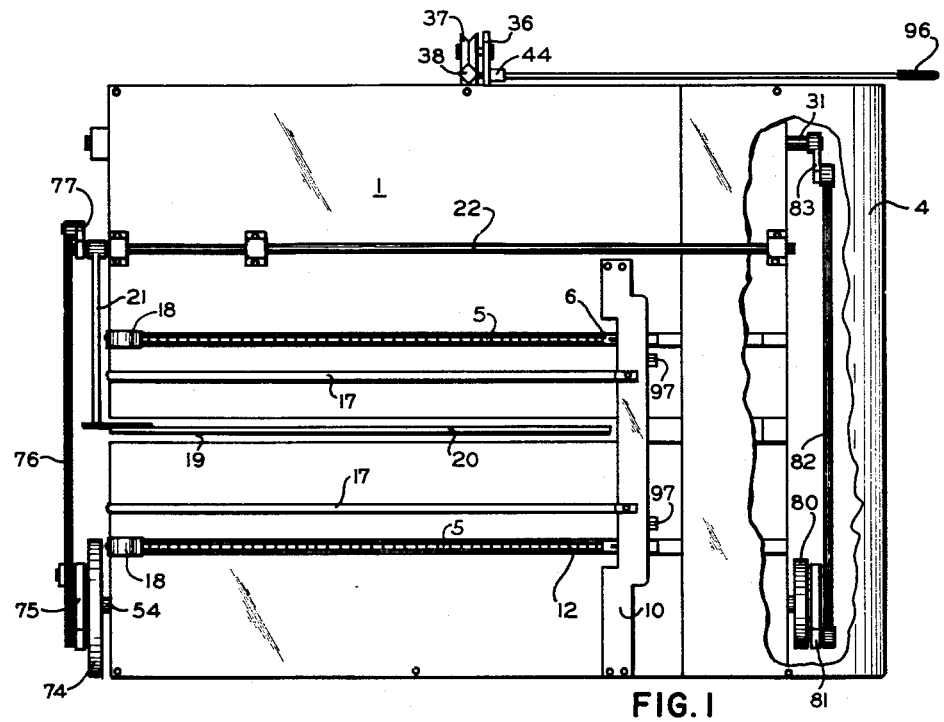
FIG. 1
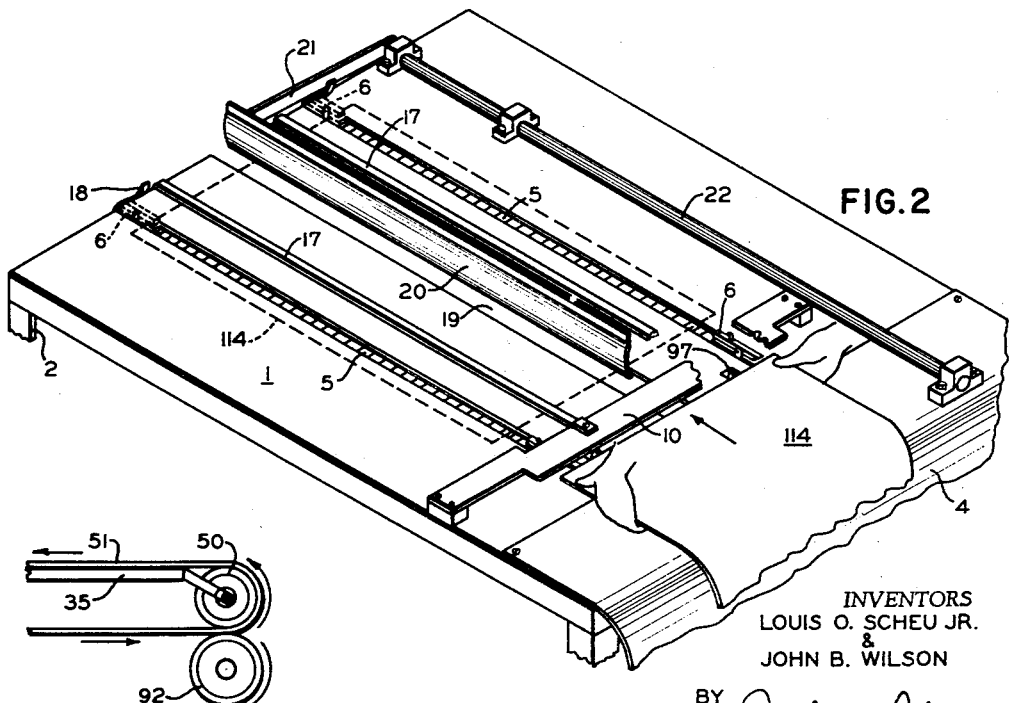
FIG. 2
FIG. 23
INVENTORS
LOUIS O. SCHEU JR.
&
JOHN B. WILSON
BY Arthur J. Robert
ATTORNEY

INVENTORS
LOUIS O. SCHEU JR.
&
JOHN B. WILSON

BY *Arthur J. Robert*
ATTORNEY

INVENTORS
LOUIS O. SCHEU JR.
&
JOHN B. WILSON
BY Arthur Robert
ATTORNEY

Oct. 10, 1961 L. O. SCHEU, JR., ET AL 3,003,760
TOWEL FOLDING MACHINE
Filed Dec. 23, 1957 5 Sheets-Sheet 5
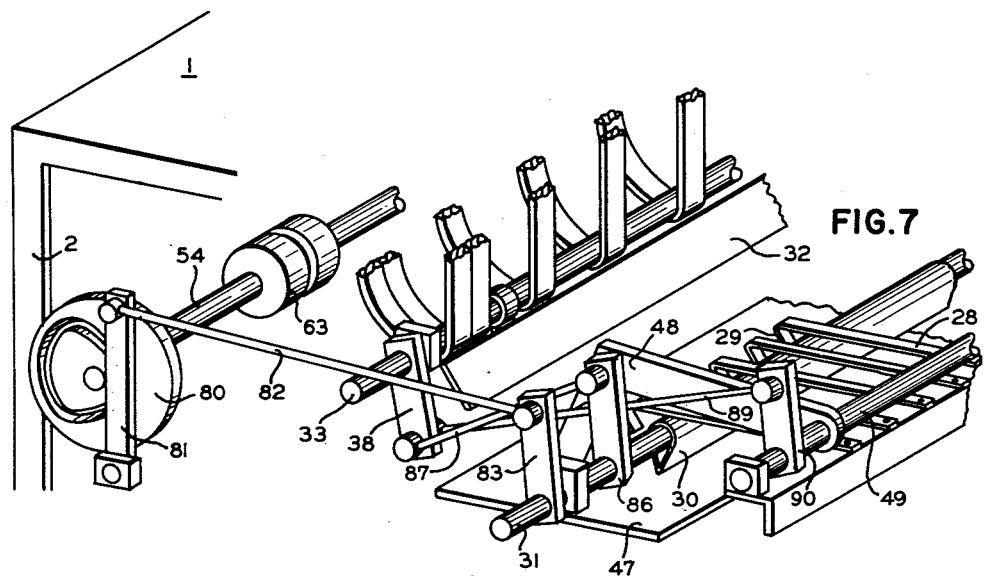
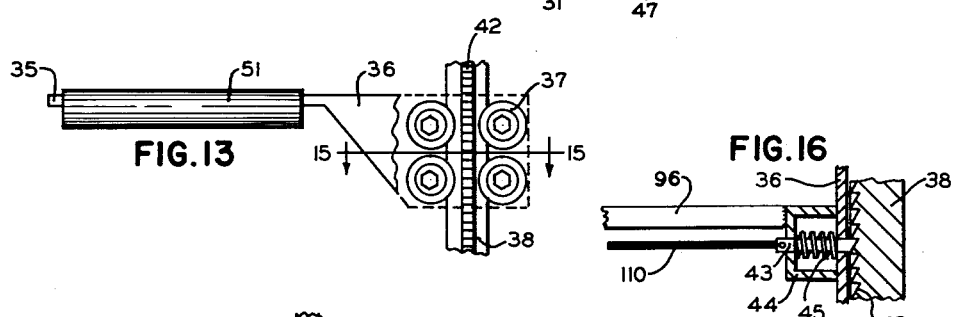
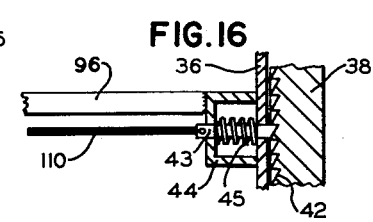
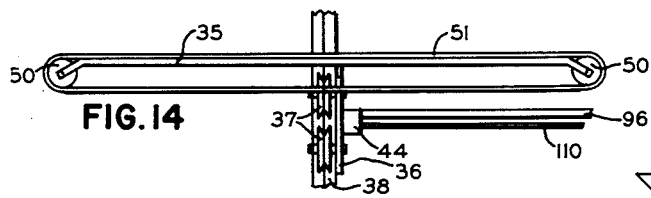
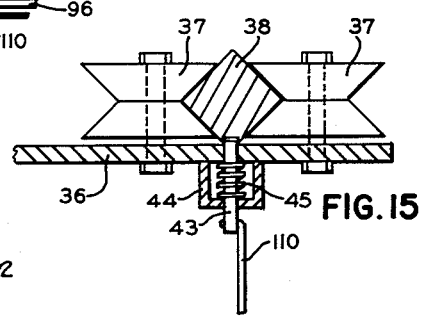
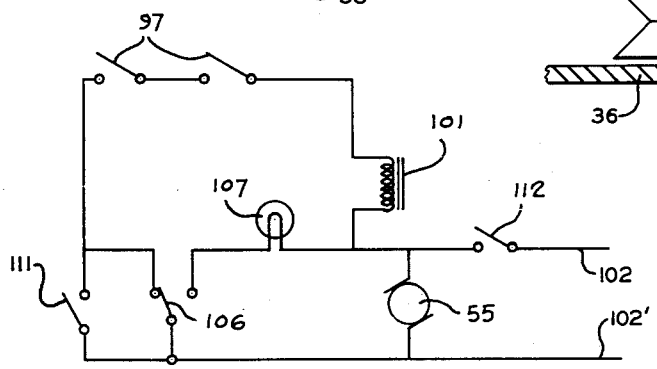
INVENTORS
LOUIS O. SCHEU JR.
&
JOHN B. WILSON
BY Arthur H. Robert
ATTORNEY United States Patent Office
3,003,760
Patented Oct. 10, 1961

3,003,760
TOWEL FOLDING MACHINE
Louis O. Scheu, Jr., Louisville, Ky. (Norwood Drive, Box 197, Rte. 1, Lyndon, Ky.), and John B. Wilson, 3702 W. Weyburn Road, Louisville, Ky.
Filed Dec. 23, 1957, Ser. No. 704,642
12 Claims. (Cl. 270—82)

This invention relates to a machine for folding and stacking flexible sheets such as towels or the like.

The practice conventionally employed in commercial laundries, handling large quantities of small sheet-like articles such as diapers, towels or work rags, is to wash and dry the articles collectively and then to smooth, fold and stack them individually in conveniently sized piles for return to their customers. The washing and drying operations are readily done by machine while the smoothing, folding and stacking operations are usually done by hand which is slow and expensive. It is desirable to effect these latter operations by machine and previous attempts have been made to design a machine for this purpose. But, to date, all of these previous machines have been unsatisfactory for one or more reasons such as being too expensive, complicated, unreliable or slow.

The principal object of this invention is to provide a rapid and reliable machine for automatically smoothing, folding and stacking small sheet-like articles of the general character of towels, and the like.

Other important objects of this invention are to provide a machine which will permit or effect one or more of the following operations: (1) when energized, it will operate automatically to set or condition itself to receive an incoming towel and remain set until a towel is received; (2) upon receiving a towel, it becomes instantly and automatically operative to smooth, fold and stack it and then reset itself to receive the next towel; (3) as it builds up a stack of towels, it records the number of towels in the stack; (4) upon stacking a predetermined number of towels, it remains operative to permit the manual removal or effect the mechanical discharge of the stack but it renders itself inoperative for further towel-stacking operation until the stack is removed and the machine is manually reset to receive the first towel of the next stack-forming series; and (5) after the stack is removed or discharged, the machine may be easily and quickly reset to receive the first towel of the next series. The foregoing objectives are achieved in a machine comprising: (1) a frame including a table top having a towel receiving slot; (2) work feeding means for receiving a towel manually fed to the machine and longitudinally smoothing it while moving it into a predetermined position in which its longitudinal (or transverse) center line is placed over said slot; (3) work folding means for transversely smoothing and folding the towel while moving it downwardly through the slot; (4) work removing means for receiving the towel from the folding means, holding it while the folding means is disengaged therefrom and then releasing it; (5) an anti-flip rail preventing the upper side of a folded towel from being flipped out of place by the folding means as it is disengaged from the towel; (6) work stacking means for receiving the towel released by the work removing means, forming a succession of such towels into a stack and maintaining the top of that stack at a predetermined level; (7) stack discharging means for discharging a full stack of towels from the machine; (8) drive means continuously energizing the machine and intermittently actuating the towel feeding, folding, removing, stacking and stack discharging means in a coordinated manner; (9) monocyclic control means to hold the machine in position to receive an incoming towel, release it to perform one cycle of operations when a towel is received and to stop the machine at the end of that cycle when it is in position to receive the next towel; (10) stack counting means to count the towels as they are stacked and to deactivate the machine when a full stack is reached; and (11) reset means to reactivate the machine after the stack is discharged and the stacking means positioned for operation on a new series of stack-forming towels.

A towel folding machine, embodying our invention, is illustrated in the accompanying drawings wherein:

FIG. 1 is a partly broken plan view of the machine;

FIG. 2 is a perspective view of the top of the machine showing, in solid lines, an operator feeding a towel to the machine, and, in dotted lines, a towel on the machine in position to be folded;

FIG. 7 is a fragmentary and somewhat schematic perspective view of the work removing means;

FIG. 13 is an enlarged fragmentary view of the stack platform and its mounting as it appears in FIG. 6;

FIG. 14 is a side elevational view of the stack platform as shown in FIG. 13;

FIG. 15 is an enlarged sectional view taken on lines 15—15 of FIG. 13;

FIG. 16 is an enlarged fragmentary view of the pawl and ratchet for the stack platform;

FIG. 17 is a wiring diagram of the machine;

Figure 3:
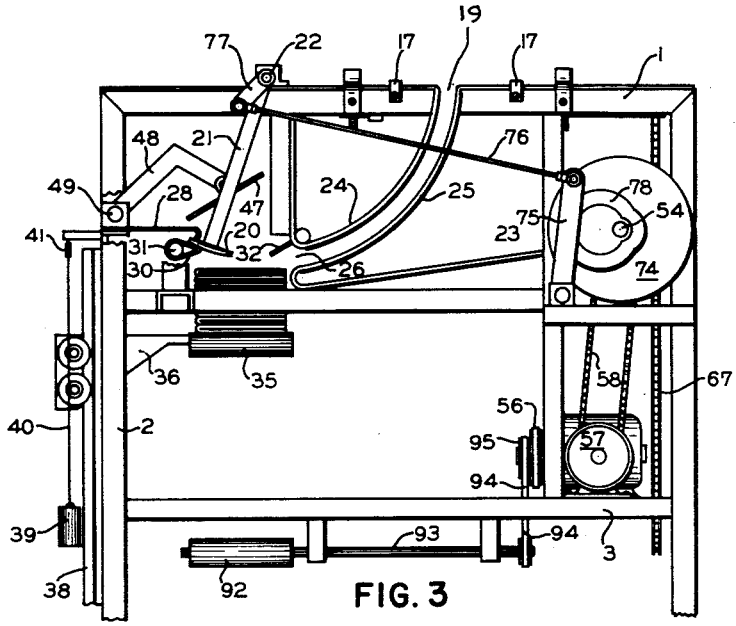
FIGS. 3–6 are elevational views respectively of the rear side, the left or drive side, the right or stack side and the front side of the machine, the front apron being omitted.
Figure 18:
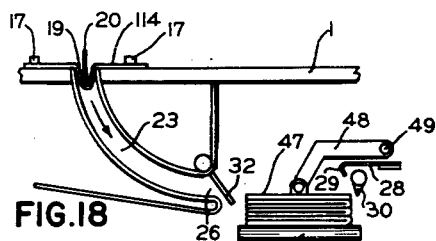
Figure 21:
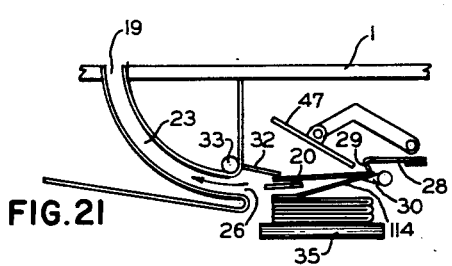
Figure 19:
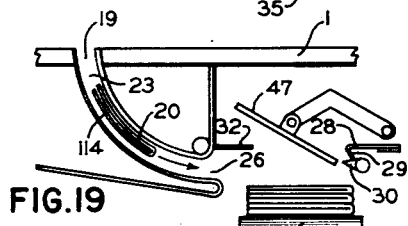
Figure 22:
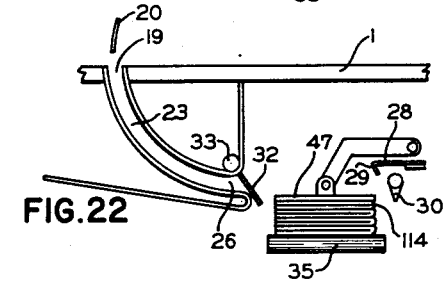
Figure 20:
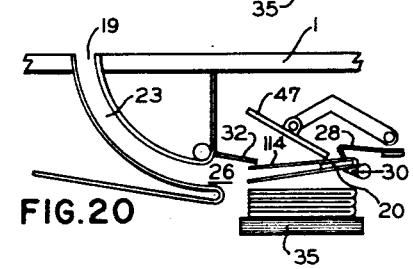

FIGS. 18 to 22 are fragmentary and somewhat schematic views showing the successive positions of the folder blade in five positions (comprising slightly, half-way and fully extended and slightly and fully retracted) and the stripper blade, the anti-flip leaf and the presser plate in their corresponding positions, all during the folding of one towel; and FIG. 23 is a fragmentary and somewhat schematic view showing the stack conveyor in its operatively driving stack discharging position.

The towel folding and stacking machine illustrated in the drawings comprises eleven elements as follows: (1) a frame; (2) work feeding means; (3) work folding means; (4) work removing means; (5) anti-flip rail; (6) work stacking means; (7) stack discharging means; (8) drive means; (9) monocyclic control means; (10) stack counting means; and (11) reset means.

FRAME—FIRST ELEMENT

The frame 1 includes a table top, also designated 1, supported at its corners by vertical legs 2. The legs 2 are supported intermediate their ends by a brace structure 3 of angle irons which extend both vertically and horizontally and also serve as supports for the machine mechanisms. In addition, a sheet metal apron 4 is fixed to the front edge of the table top 1 and curves outwardly therefrom and downwardly for about one third of the distance to the floor where it is then bent inwardly and connected to the adjacent frame legs 2.

In operating the machine, an operator stands in front of the machine facing the apron 4, lays a work piece, say a towel, over the apron and feds the top edge of the towel along the table top 1 toward the back of the machine.

WORK FEEDING MEANS—SECOND ELEMENT

The work feeding means operates, upon receiving a towel manually fed to the machine, to move it over the table top until its long center line is positioned for the folding operation and to stretch-smooth it during such movement. The means comprises: work grippers for grabbing a towel when it is manually fed across said apron 4; front gripper openers located adjacent the apron to hold said grippers in an open condition until they receive the towel; means for conveying said grippers rearwardly to pull the towel from said apron into a predetermined centrally-located position on the table top and for returning said grippers forwardly to said apron; work smoothing bars to smooth the towel as it is pulled rearwardly; and rear gripper openers located adjacent the back of said table top to open said grippers and release the towel at the end of their rearward movement.

Figure 9:
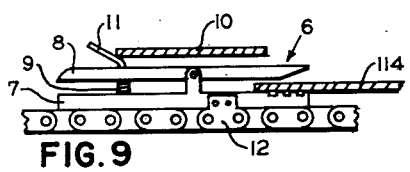
FIGS. 9 to 11 are fragmentary elevational views of a gripper respectively in its towel-receiving or starting, towel-conveying and towel-releasing positions.
Figure 10:
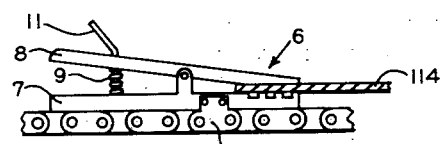
Figure 12:
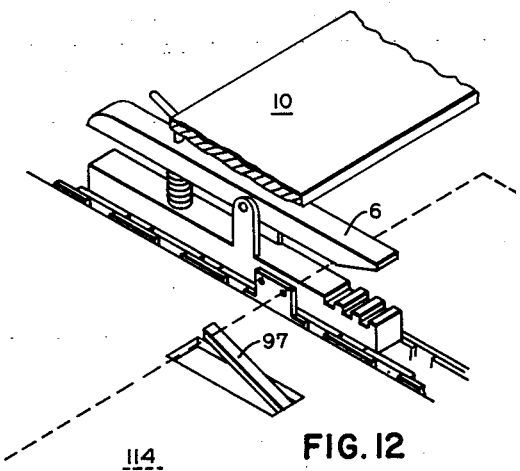
FIG. 12 is an enlarged perspective view of a gripper in its open towel-receiving position.
Figure 11:
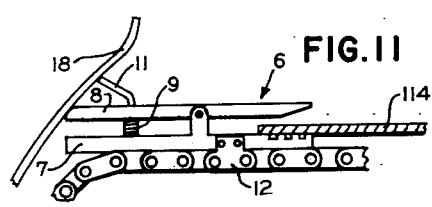

Work grippers—FIGS. 9–11

A pair of transversely spaced grippers 6 is provided. Each is similar in appearance to a conventional pivoted-jaw clothespin and therefore includes: a lower stationary jaw piece 7; and an upper relatively movable jaw piece 8 pivoted on bearing flanges mounted on the lower jaw piece 7. The jaw end of either or both pieces is grooved or serrated while the jaw end of the upper jaw piece 8 is biased downwardly toward the jaw closed position by a compression spring 9 extending between opposed rear end portions of the jaw pieces 7 and 8.

Front gripper openers—FIGS. 1, 2 and 9

In order to open the grippers 6 when they move into the towel-receiving position at the front end of the machine, a transverse bar 10 is mounted adjacent the front apron 4 and vertically spaced from the table top 1 to form a gripper accommodating slot between top 1 and bar 10. A cam projection 11 is fixed to the rear end of the upper jaw piece 8 of each gripper, as seen in FIG. 9, and arranged so that it will strike the rear edge of the bar 10 as the gripper moves forwardly under the bar and toward the apron. This cams the gripper jaws open as the forward movement is completed. The jaws then remain open until the grippers are moved rearwardly sufficiently to cause the cam 11 to clear bar 10.

Gripper conveying means—FIGS. 1–2 and 4–5

Both transversely spaced grippers 6 are mounted for reciprocation across the table top 1 between the front apron and the back of the machine. To this end, their lower jaw pieces 7, which travel in appropriate transversely-spaced slots 5 provided in the table top 1, are fixedly secured to the corresponding runs of a pair of transversely-spaced endless conveyor chains 12 mounted immediately under the table top to extend from front to rear. The chains 12 ride on two pairs of transversely-spaced sprockets 13 carried by front and rear transverse shafts 14 and 15.

The front shaft 14 extends completely across the machine from the right to the left side and is mounted in suitable bearings fixed on the frame, this shaft carrying the front pair of sprockets 13. The rear shaft 15 is divided into left and right sections or halves, one on each side of the folding slot, each section being independently mounted on the frame. The left section carries one sprocket 13 while the right section carries the other sprocket 13 of the rear pair. The front sprockets 13 function as drive sprockets and are, therefore, keyed to the front shaft 14. The rear sprockets 13 are idler sprockets and, therefore, may or may not be keyed to their respective sections of the rear shaft 15. In any event, the chains 12, being mounted on corresponding front and rear sprockets 13, move together as a unit and, as a result, carry the grippers 6 forwardly and rearwardly across the table top 1 at equal speeds maintaining their transverse alignment at all times.

Work smoothing bars—FIGS. 1 and 2

A transversely-spaced pair of smoothing bars 17 are fixed in vertically spaced relationship to the table top to extend from the front transverse gripper opening bar 10 to the back edge of the table top 1. The bars 17 are located between and extend parallel to the paths of the grippers 6, each bar being close to the gripper path on its side of the machine as seen in FIG. 1. The vertical spacing between the table top 1 and the bars 17 is selected so that the towel will be frictionally engaged by the bars as it is pulled across the table top by the grippers and stretched in the direction of its length (or width) which is parallel to its movement. In this way, the towel is smoothed in the corresponding direction and pressed flat against the table top.

Rear gripper openers—FIG. 11

A pair of forwardly and upwardly curved cam tongues 18 are fixed to the rear edge of the table top 1, one at the rear end of the travel path of each gripper 6. The rear or operating end of the upper jaw piece 8 of each gripper 6 is beveled so that when it runs into the cam tongue 18, it will be forced downwardly, thus opening the gripper's jaws to release the towel which it has just pulled across the table top 1.

WORK FOLDING MEANS—THIRD ELEMENT

The work folding means operates to stretch-smooth and fold the towel transversely while moving it downwardly into the machine along an arcuate path. This means comprises: an elongated folding slot provided in the table top 1 midway between the grippers 6 and extending from the front apron 4 to the back of the machine so as to underlie the longitudinal (or transverse) center line of a towel on the table top; a vertically swinging folder blade pivoted on the table top to swing downwardly on a towel located over the folding slot, crease the work piece along its longitudinal center line and carry it through the slot; and an arcuately extending chute fixed under the table top and having its mouth opening upwardly through said folding slot for receiving the folded towel as it is carried downwardly by said folding blade and for maintaining the towel folded as it is carried to the discharge end of the chute by the folding blade.

Folding slot—FIGS. 1 and 2

The folding slot 19 is arranged in the table top 1 midway between the grippers 6 to extend from the front apron 4 to the back edge of the table top in a direction parallel to the path of the grippers 6. The slot 19 preferably is open at the rear side of the machine. At the end of the feeding movement of the grippers 6, a work piece is located over the slot 19 in a position to be folded substantially along its longitudinal or transverse center line. Assuming that the towel is fed lengthwise over the slot, then its longitudinal center line will be located over the slot 19.

Folder blade—FIGS. 1–3

A vertically swinging folder blade 20 is arranged over the slot 19 with its rear end fixed to the outer end of a radius arm 21 through which the blade is mounted on an oscillatable shaft 22 journalled in suitable bearing blocks on the table top 1. The shaft 22 extends parallel to the slot 19 while the radius arm 21 is spaced rearwardly from the rear side of the table top. The slot 19 is open at its rear end to accommodate the rear end connection of the blade to the radius arm 21 when the folding blade 20 is operated by swinging it downwardly against the long center of a towel located over the slot 19 to crease that towel and carry it downwardly through the slot. It will be appreciated, however, that the blade connection may be made to curve upwardly from the blade permitting the slot 19 to be closed at both ends.

Arcuate chute—FIGS. 3–6 and 18–22

The chute 23, which is mounted under the table top 1, includes spaced walls extending arcuately downward from both of the elongated edges of the folding slot 19 along an 80 to 90° segment of the arcuate path of the folder blade 20. The spaced walls of the chute 23 are formed by a series of spaced upper wall bars 24 extending downwardly from and spaced along the "right" edge of the slot 19 closest to the folder blade shaft 22 and a corresponding series of spaced lower wall bars 25 extending downwardly from and spaced along the opposite or "left" edge of the slot 19.

The upper wall bars 24 are joined to the underside of the table top 1 and curve downwardly along an arc having an axis which coincides with the axis of the folder blade shaft 22. The lower ends of the bars 24 are then bent upwardly at the point where the bars are substantially tangential to the horizontal and extend from there upwardly into fixed engagement with the underside of the table top 1.

The lower wall bars 25 are joined to the underside of the table top 1 adjacent the opposite edge of the slot 19 and curve downwardly concentric to the bars 24, until reaching the point where they are substantially tangential to the horizontal, from which point they are then bent downwardly and "leftwardly" or reversely to suitable connections on the frame. The lower end of the chute 23, where the bars 24 and 25 are bent away from each other, provides a towel discharge opening 26.

As a towel is carried downwardly by the folder blade 20 successively through the slot 19 and the adjacent portion of the chute 23, its downward movement is frictionally restrained by the bars 17 so that the towel is now stretched and correspondingly smoothed in the direction of its width. As the towel and blade 20 continue through the chute 23, the towel is frictionally engaged by the walls of the chute primarily to maintain it in a folded condition and prevent its lagging free side edges from folding over upon themselves. The blade 20 moves through discharge opening 26 and then continues beyond that opening to the extent necessary to cause the trailing edges of the towel barely to exit from the discharge opening 26 of the chute. In the arrangement illustrated, this movement beyond opening 26 approximates 20°. This brings the folding blade 20 to the end of its downward swinging movement and delivers the towel to a position at which it is to be removed by the work removing means.

WORK REMOVING MEANS—FOURTH ELEMENT

The work removing means operates to receive a towel from the folding means, to hold it while the folding means is disengaged from the towel and then to release it. This means which is horizontally spaced from discharge opening 26 of the chute 23, slightly more than the width of the towel when folded, comprises: a series of spaced flexible stripper fingers located to ride over the folded end of the towel as the folder blade 20 reaches the end of its downward movement; a stripper blade pivotally mounted under the stripper fingers to cooperate therewith to receive and hold the folded edge of the towel; and an anti-flip rail pivotally mounted in position closely to overlie the trailing or lagging free edges of the work piece as the folder blade is retracted.

Stripper fingers—FIGS. 3 and 7

The stripper fingers 28 comprises a series of spaced leaf springs mounted in a row extending from the front to the back of the machine between the "right" side of the machine and the discharge opening 26 of the chute 23. They are located to engage and ride resiliently over the folded edge of a towel as it is carried into its work removing position. Each of the spring fingers 28 include a long horizontal leg, also indicated 28, fixed at one end on a suitable angle bar of the frame 1 and a claw leg 29 extending downwardly from the other or free end of the horizontal leg at an appropriate inclination so that the finger will be cammed upwardly by its engagement with the folded edge of a towel on the folder blade 20. After the claw leg 29 is cammed upwardly, it operates to press the folded margin of the towel downwardly first against the blade 20 and, when that blade retreats slightly, next against the underlying stripper blade 30.

Stripper blade—FIGS. 3 and 7

The stripper blade 30, which is located under the stripper fingers 28, also extends from the front to the back of the machine between the right side thereof and the chute discharge opening 26. The "right" longitudinal edge of the blade 30 is fixed to a shaft 31 journalled in suitably located bearings fixed on the frame 1 so that the blade may be swung upwardly to its work receiving and holding position and downwardly to its work releasing position.

The blade 30 is swung upwardly to engage the claws 29 of the fingers 28 in which position it is pointing toward the discharge opening 26 of the chute 23 and is located to lie closely under the path of the folder blade 20. After the folder blade 20 thrusts the folded edge of a work piece between the upper stripper fingers 28 and the lower stripper blade 30, it reverses its movement and swings out from between the fingers 28 and stripper blade 30 leaving the folded edge of the work piece engaged between the spring fingers 28 and the stripper blade 30. After the folder blade 20 continues its retraction, it completely disengages itself from the folded towel whereupon the stripper blade 30 is then swung downwardly to release the folded towel while the anti-flip rail 32 is swung downwardly.

ANTI-FLIP RAIL—FIFTH ELEMENT

The anti-flip rail operates, during the first 20° of the retraction movement of the holder blade 20, to keep the upper portion of the last folded towel from being flipped upwardly and turned upon itself as the folder blade 20 is retracted. This has the advantage of permitting the folder blade to operate at a substantially higher speed than could be used otherwise.

The anti-flip rail 32 is located along the upper edge of the discharge opening 26 of the chute 23 to extend from the front to the back of the machine. The "left" longitudinal edge of the elongated rail 32 is fixed to a shaft 33 journaled in suitable bearings mounted in the bends of the upper wall bars 24 of the chute 23. The rail 32 can swing between a horizontal position pointing toward the stripper fingers 28 and a downwardly inclined position more or less covering the discharge opening 26.

The anti-flip rail 32 is swung upwardly to uncover the discharge opening 26 and remains in this position during the last 20° of the extension movement and the first 20° of the retraction movement of the folder blade 20 between the chute 23 and the work removing position. In its upper position, it keeps the upper portion of the folded towel from being flipped upwardly and turned upon itself as the folder blade 20 is retracted. After the folder blade 20 is returned into the chute, the rail 32 may be and preferably is swung downwardly to cover the chute where it is out-of-the-way of a work stack presser 47.

WORK STACKING MEANS—SIXTH ELEMENT

The work stacking means operates to receive the towel released by the work removing means, to form a succession of such towels into a stack and to maintain the top of that stack at a predetermined level. This means is located between the discharge opening 26 of the chute 23 and the stripper fingers 28 and comprises: a work stack platform on which the towels are deposited as they are released from the stripper fingers 28 and blade 30; an elevator mounting for the stack platform to allow it to move downwardly so that the top of the work stack remains at the same level as the stack is built up; a counterweight to bias the platform yieldably upward; a ratchet detent to lock the platform against upward movement;

and a presser plate pivoted to drop downwardly on the top of the stack to push the platform downwardly step-by-step as the stack builds up.

Stack platform—FIGS. 3 to 6

A rectangular horizontal stack platform 35 is provided and located under the space between the chute discharge opening 26 and the stripper blade 30 with its folded width dimension extending therebetween and its length dimension extending between the front and rear ends of the machine. Thus, the stack platform 35 is in a position to receive a folded towel as it is released and dropped by the stripper fingers 28 and stripper blade 30. It is arranged for vertical movement from an extreme upper position to a lower position so as to accommodate a progressively rising load of work pieces.

Figure 6:
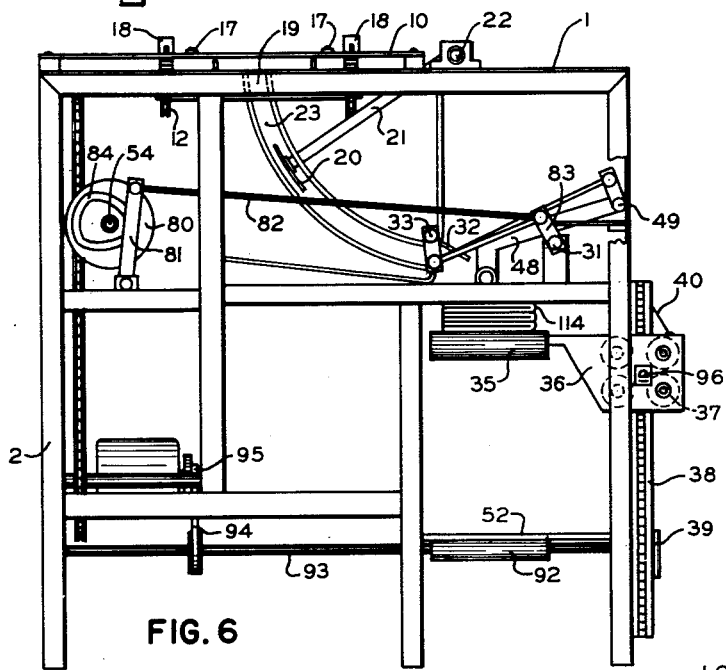

Elevator mounting—FIGS. 3, 6 and 13

The stack platform 35 is fixed midway of its length to the outer or free end of a cantilever arm 36, which is supported at its other end on a carriage having four rollers 37 arranged for vertical travel on a vertical post 38. The guide post 38 is fixed at its upper and lower ends to the frame 1. Each pair of rollers 37 cooperatively provide a V-shaped periphery and travel on a pair of diametrically opposite vertical corners of the post 38 which is square in cross-section. The post end of the cantilever arm 36 is horizontally forked to receive and encircle the post 38 as seen in FIG. 15 and the rollers 37 are pivoted on horizontal pins extending between the forks of the arm 36.

Figure 5:
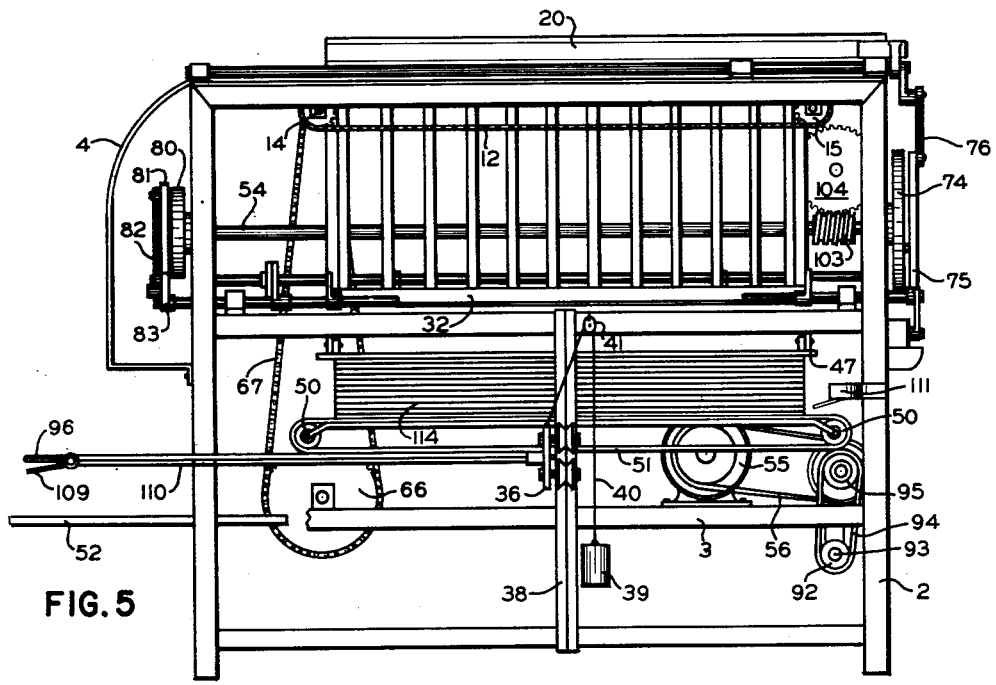

Counterweight—FIGS. 3, 5 and 6

A counterweight 39 biases the stack platform 35 upwardly. This counterweight 39 is attached to the lower end of a wire rope 40 which extends upwardly therefrom over a pulley 41 mounted on the frame 1 and downwardly to a connection on the post end of the cantilever arm 36.

Ratchet detent—FIG. 16

The guide post 38 has a vertical ratchet strip 42 fixedly secured to it in a vertical groove on its front corner. The post end of the cantilever arm 36 carries a horizontal pawl 43 mounted in a bracket 44 and biased toward the ratchet 42 by a spring 45 engaged between the bracket 44 and a suitable abutment on the pawl. The pawl 43 has step-by-step engagement with the ratchet 42 in the downward direction but locking the stack platform 35 against upward movement. The pitch of the teeth on ratchet 42 preferably equals the combined thickness of two or three folded towels.

Presser plate—FIGS. 3 and 5 to 7

The presser plate 47 is located to move downwardly into and upwardly out of the space between the chute discharge opening 26 and the stripper fingers 28. It overlies the stack platform 35 and substantially corresponds in size and shape to that platform. Its opposite ends are fixed to the outer ends of a pair of transversely spaced downwardly-curved arms 48 whose opposite ends are fixed to a shaft 49. The shaft 49 extends parallel to the stripper blade shaft 31, is located slightly above the fixed ends of the stripper fingers 28 and is journalled in suitable bearings fixed on the frame 1.

The presser plate 47 oscillates between a lower horizontal position, wherein it presses downwardly on the top of the work stack, and an upper inoperative position. It is swung upwardly to its inoperative position prior to the emergence of a folded towel from the chute discharge opening 26 and remains in this upper position until the folder blade has been fully retracted into the chute 23. After this, the arm 48 carrying the presser plate starts to swing downwardly. At the same time, the folded towel is released from the stripper fingers 28 and blade 30 so that it may drop upon the work stack.

The presser plate is moved downwardly until it engages the top of the work stack, flattens the newly dropped towel and forces the stack and stack platform 35 downwardly a half or third fraction of the pitch distance of the ratchet teeth 42. With this arrangement, the presser plate lowers the stack enough to latch it to the next lower tooth of the ratchet 42 after each deposit of 2 or 3 towels. As a consequence, the top of the stack remains substantially at an elevation, which is slightly below the level of the lower edge of the chute discharge opening 26 while the stack platform 35 is forced downwardly step-by-step as the height of the stack is progressively increased.

If a hot pressing action is desired, the presser plate 47 may be heated with thermostatically controlled electrical heating elements either embedded in the plate or attached to its upper face.

STACK DISCHARGING MEANS—SEVENTH ELEMENT

As illustrated in FIG. 14, the stack platform 35 is provided, at its front and rear ends, with rollers 50, which extend across the platform ends and carry a platform encircling flexible conveyor belt 51. The width of the belt 51 susbtantially corresponds to the width of the stack but is slightly less than that of the platform 35.

With this arrangement, the towels are actually stacked upon the upper run of the belt 51, which is normally stationary. This belt moves downward with but not relatively to the platform as the towels are stacked. When a full stack has been loaded on the belt 51, the belt stands but slightly above the level of work discharge shelf 52 shown at the front of the machine in FIG. 5. Consequently, the belt may now be rotated manually or automatically to convey the stack toward and discharge it on shelf 52. Its automatic operation is subsequently described.

DRIVE MEANS—EIGHTH ELEMENT

The drive means operates the towel grippers, folder blade and strippers, the anti-flip rail and the presser plate in a coordinated manner to feed an incoming towel, fold and remove it from the folder blade and then stack it and thereafter may be used to operate the stack conveyor to discharge a stack of towels mechanically from the machine.

The drive means includes: a continuously energized main drive; an intermittently actuated secondary drive which is intermittently connected to the main drive; a series of separate drives which are permanently connected to the secondary drive for corresponding intermittent operation thereby in coordinated fashion, these separate drives including towel gripper, folder blade and stripper drives directly connected to the secondary drive, an anti-flip rail drive connected to the stripper drive and a presser plate drive connected to the anti-flip rail drive; and a stack conveyor drive normally disconnected from but connectible to the main drive for operation thereby.

Continuously energized main drive—FIGS. 3 to 6

The main drive includes: an electric motor 55; motor driven belt 56; a belt drive gear reducer 57; a reducer driven chain 58; and a chain driven idler sprocket 59, which forms the continuously operating drive element of a chain driven friction clutch through which the continuously operating main drive may be intermittently connected to the intermittently actuated secondary drive.

Intermittently actuated secondary drive

The secondary drive includes: a friction plate 60 forming the intermittently driven element of the friction clutch which connects the main and secondary drives; a shaft 54 which extends horizontally under the table top, from front to rear (FIG. 4) on the "left" or drive side of the machine (FIG. 6) and is journalled in suitable bearings on the frame; and conventional means fixedly mounting the friction clutch plate 60 on the shaft 54.

Between successive towel manipulating operations, the secondary drive is held against movement by a monocyclic control mechanism which is later described. The frictional engagement between clutch plate 60 and clutch sprocket 59 is adjusted so that the drive motor is not overloaded either during the operating or nonoperating intervals of the secondary drive.

Figure 4:
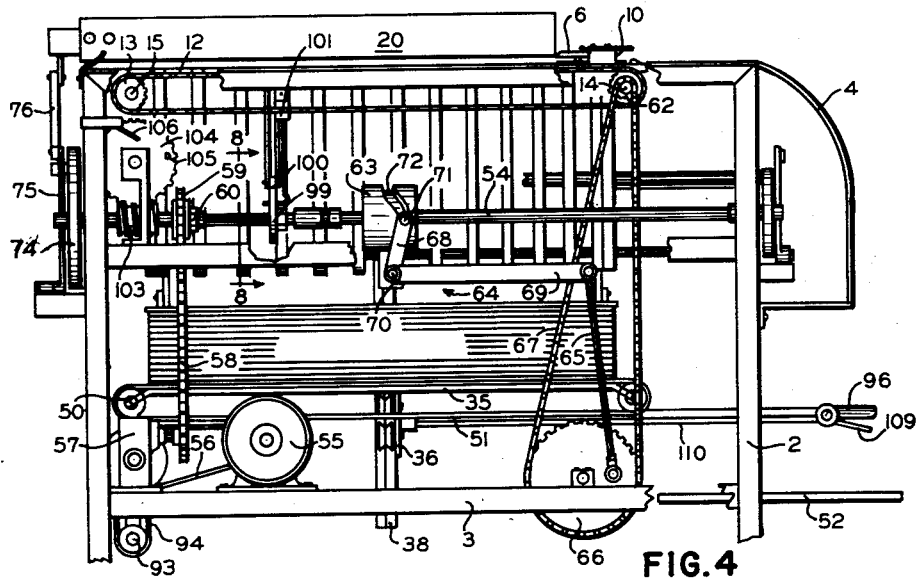

*Gripper drive—FIG. 4*

The secondary drive operates for one towel, to effect one reciprocation of the grippers 6 between their front work receiving and rear work releasing positions and, more particularly, to effect a corresponding oscillation of the conveyor-like assembly (i.e. the front and rear shafts 14 and 15, front and rear sprockets 13 and the chains 12), on which the grippers are mounted. The secondary drive shaft 54 is, therefore, connected to the front shaft 14 of that oscillatable gripper-supporting assembly through a drive train which includes: a drum cam 63 fixed on the secondary drive shaft 54; a drum cam oscillated bell crank 64; a bell crank operated link 65; a link oscillated idler sprocket 66; a sprocket operated chain 67; and a chain operated sprocket 62 mounted on the front shaft 14 of the oscillatable assembly on which the grippers 6 are mounted.

The bell crank 64 includes a short leg 68 and a long leg 69, both of which diverge from an intermediate pivot 70 journalled on suitable bearings on the frame 1. The outer end of the short leg 68 carries a follower 71 which rides the drum cam groove 72 arranged in the periphery of the drum 63. The outer end of the long leg 69 is pivoted to the upper end of the link 65 which, in turn, is eccentrically connected at its lower end to the idler sprocket 66. The idler sprocket 66 is freely rotatable about a suitable pivot on the frame 1. The connecting chain 67 extends over sprockets 62 and 66.

When the grooved drum cam 63 makes one complete revolution, it effects one oscillation of the bell crank 64 back and forth to reciprocate the link 65 up and down. This causes the idler sprocket 66 to rock back and forth and thereby reciprocate the chain 67 to rotate the sprocket 62 first one way and then the other and thereby oscillate the gripper-mounting assembly to reciprocate the grippers 6 between the front apron 4 and the rear edge of the table top 1. As seen in FIG. 4, the groove 72, of the drum cam 63, first rocks the bell crank 64 counterclockwise to move the grippers rearwardly during the first quarter turn (0 to 90°) of the secondary drive shaft 54 from a starting position; next maintains the bell crank 64 stationary during the next quarter turn (90° to 180°) of shaft 54; then rocks the bell crank 64 clockwise to move the grippers forwardly during the third quarter turn (180° to 270°); and finally maintains the bell crank stationary at its starting position during the last quarter turn (270° to 360°).

*Folder blade drive—FIG. 3*

The secondary drive operates, for one towel, to effect one oscillation or reciprocation of the folder blade 20 between its upper inoperative starting position and its lower folded towel delivering position and, more particularly, to effect a corresponding oscillation of the shaft 22 on which the folder blade 20 is mounted. The secondary drive shaft 54 is, therefore, connected to the folder blade shaft 22 through a drive train which includes: a folder blade cam 74, fixed on the rear end of the shaft 54; a cam follower arm 75; a follower driven link 76; and a link driven crank 77 fixed on the end of the folder blade shaft 22.

The cam follower arm 75, which carries between its ends a cam follower riding in the cam groove 78, is pivotally connected at its lower end to the frame 1 and at its upper end to one end of link 76. The opposite end of the link 76 is pivoted to the outer end of the crank 77, the inner end of which is fixed on the shaft 22.

The groove 78, of the folder blade cam 74, first maintains the drive train stationary during the first quarter turn (0 to 90°) of the secondary drive shaft 54, thereby holding the folder blade 20 in its uppermost position; next it swings the folder blade downwardly during the nxet ⅜ turn (90° to 225°) of shaft 54; and finally swings the blade upwardly during the last ⅜ turn (225° to 360°) of shaft 54.

*Stripper blade drive—FIGS. 6 and 7*

The secondary drive operates, for each towel, to effect one oscillation of the stripper blade 30 between its lower inoperative position and its upper operative stripping position and, more particularly, to effect a corresponding oscillation of the shaft 31 on which the stripper blade 30 is mounted. The secondary drive shaft 54 is, therefore, connected to the stripper blade shaft 31 through a drive train which includes: a cam 80 fixed on the front end of the shaft 54; a cam follower arm 81; a follower driven link 82; and a link driven crank 83 fixed on the stripper blade shaft 31.

The cam follower arm 81 is pivoted at its lower end on the frame 1, has a cam follower riding in the cam groove 84 and is pivotally connected at its upper end to one end of the link 82 which is pivoted at its other end to the free end of the crank 83.

The groove 84 of the stripper blade cam 80 first holds the stripper blade stationary during the first quarter turn of the shaft 54; next swings the blade 30 upwardly into engagement with the stripper fingers 28 during the second quarter turn of shaft 54; then holds the stripper blade in this raised stripping position during the third quarter turn of shaft 54; and finally returns it downwardly to its starting position during the last quarter turn of the shaft.

*Anti-flip rail drive—FIG. 7*

The secondary drive operates through the stripper blade drive, for one towel, to effect one oscillation of the anti-flip rail 32 between its lower presser blade clearing position and its upper towel protecting position and, more particularly, to effect a corresponding oscillation of the shaft 33 on which the anti-flip rail 32 is mounted. The secondary drive shaft 54 is, therefore, connected through stripper blade cam 80, follower arm 81, link 82 and crank 83 to stripper blade shaft 31 and this shaft is connected to the anti-flip rail shaft 33 through a drive train which includes: a crank 86 on stripper blade shaft 31; a crank driven link 87; and a link driven crank 88 on anti-flip rail shaft 33.

The cranks 86 and 88 are arranged to extend in relatively opposite radial directions so that the clockwise movement of stripper blade shaft 31 effects counterclockwise movement of the anti-flip rail shaft 33.

The crank 86 on the stripper blade shaft 31 first holds the anti-flip rail 32 stationary in its lower presser plate clearing position during the first quarter turn of the shaft 54; next swings it counterclockwise to its raised operative position during the second quarter turn of shaft 54; then holds it in its raised operative position during the third quarter turn of shaft 54; and finally returns it downwardly to its starting position during the last quarter turn of the shaft.

*Presser blade drive—FIG. 7*

The secondary drive operates serially through the stripper blade and anti-flip rail drives, for one towel, to effect one reciprocation of the presser plate 47 between its lower stack engaging position and its upper inoperative position and, more particularly, to effect a corresponding oscillation of the shaft 49 to which the presser blade is connected. The secondary drive shaft 54 is, therefore, connected through stripper blade cam 80, follower arm 81, link 82 and crank 83 to stripper blade shaft 31 and from this shaft through crank 86, link 87 and crank 88 to anti-flip rail shaft 33, this latter shaft being connected to presser blade shaft 49 through a drive train which includes: crank 88 on anti-flip rail shaft 83, crank driven link 89 and link driven crank 90 on presser plate shaft 49.

The cranks 88 and 90 are arranged to extend in relatively opposite radial directions so that counterclockwise movement of anti-flip rail shaft 33 effects clockwise movement of presser plate shaft 49.

The crank 88 on the anti-flip rail shaft 33 first holds the presser plate stationarily in its lower position on the top of the stack during the first quarter turn of the shaft 54; next raises it to its uppermost inoperative position during the second quarter turn of shaft 54; then holds it in its raised inoperative position during the third quarter turn of shaft 54; and finally returns it downwardly to its starting position during the next quarter turn of the shaft.

Stack conveyor drive—FIGS. 3–6

The stack conveyor drive comprises a friction roller normally spaced below the stack; means for continuously rotating it; and means for lowering the stack to drive the conveyor belt from the friction roller.

The friction roller 92 is located under the rear end of the stack platform 35 in position to engage the belt 51 when the stack platform is at the bottom of its vertical travel on post 38. Preferably, friction roller 92 is located directly underneath the rear roller 50 for the conveyor belt 51. The friction roller 92 is fixed to the rear end of a shaft 93 which is journalled in suitable frame supported bearings.

The continuously energized drive for the friction roller comprises: main drive motor 55; motor driven belt 56; belt driven double pulley 95, which is on the input shaft of the gear reducer 57; pulley driven belt 94; and belt driven shaft 93 of roller 92.

The mechanism for lowering the stack to bring the conveyor belt into driven engagement with roller 92 comprises: a lever 96 fixed at its inner end to the post end of cantilever arm 36 and extending forwardly therefrom to the front of the machine where it is within easy reach of the machine operator. It will be understood that the operator, by pushing lever 96 downwardly, lowers the stack platform enough to bring the belt 51 into driven-engagement with the continuously rotating friction roller 92 to effect the discharge of the towel stack onto shelf 52 at the front end of the machine. Naturally, the engagement of the pawl 43 with ratchet 42 will hold the stack in this, its lowermost, position.

MONOCYLIC CONTROL MEANS—NINTH ELEMENT

The monocyclic control means operates to latch the secondary drive against operation, to release it each time a towel is fed by an operator and to stop it at the end of each cycle of operation. It comprises: latch means normally operative to stop the secondary drive at the end of each cycle of operation corresponding to each revolution of secondary drive shaft 54; and a normally open electrical control circuit adapted to be closed by the insertion of a towel into the grippers 6 and operative, when closed, to unlatch the secondary drive.

Figure 8:
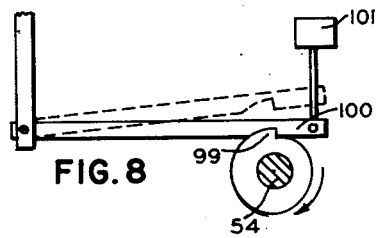
FIG. 8 is a fragmentary view of the mechanism for starting and stopping the automatic operations of the machine.

Latch means—FIGS. 4, 8 and 17

The latch means includes: a ratchet wheel 99 fixed on secondary drive shaft 54 and provided with a single ratchet tooth; a latch arm 100 pivoted on frame 1 and normally resting on the ratchet wheel in position to engage the tooth 99 at the end of one revolution of the shaft 54 and latch the shaft against further rotation; and the plunger of solenoid 101, this plunger being connected to raise the latch arm 100 out of latching engagement with ratchet wheel 99.

Electrical control circuit—FIG. 17

The normally open electrical control circuit includes: a pair of line terminals 102, 102'; a solenoid coil 101 connected across the line; and a pair of normally open switches 97 serially connected with each other and with the solenoid 101. The switches 97, when closed, complete the electrical control circuit and render it operative to energize the solenoid 101 and thereby unlatch the secondary drive. These switches 97 are attached underneath the table top 1 adjacent the apron 4 in transversely-spaced relationship placing each one near one of the transversely-spaced gripper paths.

Each switch has an operating finger, also designated 97, projecting upwardly through a small opening in the table top 1 into the path of an incoming towel which is being fed to the grippers 6. Each finger 97 is spring biased upwardly. It must be forced downwardly by the leading edge of an incoming towel in order to close its switch. But this can be done only after the towel has been well inserted into the open jaws of the grippers 6. Since both switches 97 are wired in series, this arrangement insures that the leading edge of the work piece is properly fed to both grippers 6 before the machine is started.

Stack counting means—tenth element

The stack counting means operates to count the towels as they are stacked, to deactivate the machine when a full stack is reached and to signal that condition. It comprises: a work counter for counting the towels processed by the machine; means operative, when a full stack is reached, to open the control circuit and thereby render the secondary drive inoperative; and means operative, also when a full stack is reached, to operate a signal means.

The work counter—FIG. 4

The work counter may comprise any means of indicating the number of revolutions of shaft 54. Preferably it includes: a single threaded worm 103 mounted on drive shaft 54; and a frame-mounted worm gear 104 engaged with and driven by the worm 103 and having a number of teeth equal to the number of towels in one or more full stacks. Consequently, each revolution of the shaft 54 (and of the worm 103) turns the worm gear 104 a distance of say one tooth. Fifty revolutions of the shaft 54 and of the worm 103, are required to stock 50 towels and to effect one complete revolution of the worm gear 104 when it has 50 teeth, one for each towel.

Control circuit opening means—FIGS. 4 and 17

This means includes: a normally closed switch 106 serially contained in the control circuit and operative, when opened, to render that circuit inoperative and thus prevent it from setting the secondary drive system in operation; and an abutment pin 105 mounted on and projecting from the outer face of worm gear 104 in position to engage and open switch 106 each time pin 105 is carried through a full revolution by worm gear 104 and, therefore, each time the machine has stacked a number of towels equal to the number of teeth in the gear.

Signal means—FIG. 17

The signal means comprises: a normally open branch circuit containing signal lamp 107 and extending across the line terminal; and a switch for closing that circuit when a full stack is reached. Since the normally closed stop switch 106 is opened by pin 105 when a full stack is reached, that open switch may conveniently be arranged to close the signal circuit as indicated in FIG. 17.

RESET MEANS—ELEVENTH ELEMENT

The reset means operates to reactivate the machine only after two things are done, viz: the stack must be removed or discharged and the stacking means must be raised into a position to receive the first towel of a new stack-forming series. This means comprises: a normally open switch adapted to be closed by the empty stack platform 35 at the top of its upward movement and arranged in the control circuit to be operative, when closed, to short circuit open stop switch 106 and thereby condition the control system for normal operation; and pawl release means for disengaging the pawl from the ratchet so that the stack platform can be raised to its uppermost position to close the reset switch.

*Normally open reset switch—FIGS. 5 and 17*

This switch designated 111, is mounted on the right-rear corner of the frame as seen in FIG. 5. It should be positioned not only to be closed by the empty platform but to remain closed until the machine has received and folded enough towels to effect the movement of pin 105 sufficiently away from stop switch 106 to permit switch 106 to reclose.

*Pawl release means—FIGS. 5, 15 and 16*

The pawl release means includes: a spring biased trigger 109 pivoted on the outer end of lever 96; and a link 110 in the form of a rope or wire cable converting the trigger to spring-pressed pawl 43. It will be understood that the operator, by squeezing the trigger 109 against lever 96, disengages pawl 43 from ratchet 42 leaving the stack platform 35 free for counter-weighted or manually-forced upward movement and permitting it to be raised to its uppermost position.

OPERATION

Assuming that the folding machine is empty and at rest with its electrical power turned off and that the stack platform is in its lowermost position. The operator now closes the main power line switch 112 to energize the main drive and the stack conveyor drive if the platform is low enough. The motor 55 and other main drive elements thereafter remain in continuous rotation as long as the main power line switch 112 is closed. The secondary drive is not yet in operation.

The operator then grasps the stack platform lever 96, squeezes the trigger 109 to release the pawl 43 from the ratchet 42 and raises the lever 96 to lift the stack platform 35 to the top of its travel where it closes the reset switch 111. This conditions the control circuit for normal operation even if stop switch 106 is open as it is likely to be.

Meantime the secondary drive shaft 54 is locked against turning by latch 100. In this position, the grippers 6 are held open. The machine is now ready for operation.

The operator selects a towel 114, holds one end of the towel between his hands as seen in FIG. 2, lays this end on the apron 4 with the remainder of the towel extending toward the operator and downwardly over the apron, and pushes the leading edge of the towel into the open grippers 6. When the leading edge of the towel is well into the grippers 6, it closes the switches 97, energizes solenoid 101 to unlatch the secondary drive and thus starts the machine in operation.

During the first quarter turn (0° to 90°) of the drive shaft 54, the grippers 6 move from the front to the rear of the table top 1, pulling the towel 114 into a centered location over the folding slot 19 as shown in dotted lines in FIG. 2. During the first fractional inch portion of this movement, the open grippers leave bar 10 and close firmly on the edge of the towel 114. As they pull the towel rearwardly, the frictional engagement of the work smoothing bars 17 with the towel tends to restrain and thereby stretch-smooth the towel 114. When the grippers 6 reach the rear end of the table top 1, they strike the gripper release tongues 18 and are opened to release the towel 114.

During the next quarter turn, several operations take place namely: the grippers remain stationary at the rear edge of the table top 1; the folder blade 20 moves downwardly onto the towel 114, creasing it and carrying it downwardly through the folding slot 19 and into but not entirely through the chute 23; the stripper blade 30 is swung upwardly into engagement with the stripper fingers 28; the anti-flip rail 32 is swung upwardly to its upper operative position; and the presser plate 47 is raised to its inoperative position above the lower end portion of the folder blade path.

During the next one-eighth turn (180–225°): the grippers begin to return to the apron 4; the stripper blade 30, the anti-flip rail 32 and the presser plate 47 remain stationary; and the folder blade 20 emerges from the chute discharge opening 26 carrying the folded towel 114 and forcibly inserts the folded edge of the towel 114 in between the upper stripper fingers 28 and the lower stripper blade 30.

During the next one-eighth turn (225–270°): the grippers 6 finish their return movement to the apron 4; the stripper blade 30, the anti-flip rail 32 and the presser plate 47 remain stationary; and the folder blade 20 reverses its swinging movement, retracts from between the stripper fingers 28 and the stripper blade 30 leaving the folded edge of the towel between the stripper fingers and blade, passes rearwardly under the anti-flip rail 32, disengages itself from the folded towel 114 and moves into and entirely within the chute 23.

During the last quarter turn (270–360°): the grippers 6 remain stationary; the folder blade 20 finishes its return to its starting location above the slot 19; the stripper blade 30 drops downwardly to release the folded towel 114 and permit it to drop on the stack platform 35; the anti-flip rail 32 drops to clear the path of the presser plate 47; and the presser plate 47 swings downwardly to engage the folded towel 114 on the stack platform and to press the stack platform 35 downwardly a half or third fraction of a step on its ratchet. A summary of these operations is given in the following operation table.

OPERATION TABLE

| Drive Shaft 54 | Grippers 6 | Folder Blade 20 | Stripper Blade 30 | Anti-Flip Rail 32 | Presser Plate 47 |
| --- | --- | --- | --- | --- | --- |
| Starting Position | near front apron 4 | spaced above slot 19 | extended down | extends downardly out of presser plate path. | engages top of stack. |
| 0°–90° | moves to rear of table top 1. | remains stationary | remains down and stationary. | remains down and stationary. | remains stationary. |
| 90°–180° | remains stationary | swings down through slot 19 and chute 23. | swings up to engage fingers 28. | rises to operative position out of folder blade path. | moves up above stack out of folder blade path. |
| 180°–225° | starts forward return to apron. | continues swinging and enters fingers 28 and blades 30. | remains up and stationary. | remains up and stationary. | remains up and stationary. |
| 225°–270° | finishes return to apron. | retracts from towel latch 28, 30 into chute 23. | do | do | Do. |
| 270°–360° | remains stationary | finishes retraction to start position above slot 19. | swings to downwardly extended inoperative position. | drops out of presser plate path. | drops through folder blade path to top of stack. |

When the secondary drive shaft 54 completes one revolution, it will again be latched in its ready-to-start position. The secondary drive now is once again at rest and will only be started by the insertion of another towel into the grippers 6.

The foregoing operation will be repeated each time a towel is fed to the machine until the stack of towels on the stack platform 35 reaches a predetermined number, say 50 towels. In this case, the work counter worm gear 104 has 50 teeth and is rotated one complete revolution by the feeding of 50 individual towels through the machine. At the end of folding and stacking the final towel in the stack of 50 towels, the worm gear abutment pin 105 operates the stop switch 106 to open the control circuit, and close the circuit of signal light 107.

The operator now pushes the stack platform lever 96 downwardly until belt 51 engages continuously rotating friction roller 92 to effect the discharge of the stack of towels onto the work discharge shelf 52.

After the stack is discharged, the operator squeezes trigger 109 on lever 96 to release the pawl 43 from the ratchet 42 and then lifts lever 96 to raise the empty stack platform to the top of its travel and close reset switch 111. The machine is now ready to receive the first towel of the next stack-forming series.

MODIFICATIONS

The described machine may be modified by providing the presser plate 47 with a means such as an electrical coil for heating it. In this modification, the presser plate 47 will iron or smooth the folded work piece on the top of the work stack each time it presses downwardly on the top of the stack.

Having described our invention, we claim:

1. A machine for folding flexible sheets such as towels, diapers and the like comprising: a frame having a work surface containing an elongated folding slot; work feeding means mounted on said frame for feeding and return movement between spaced flat-sheet receiving and releasing positions and operable to grasp a flat sheet fed thereto in its receiving position, to move said sheet to and release it at said releasing position wherein said flat sheet covers said folding slot and thereafter to return to said sheet-receiving position; work folding means mounted on said frame for sheet-delivering and return movement between inoperative and folded-sheet delivery positions respectively spaced above and below said folding slot and operable, upon moving from its inoperative position, to engage a flat sheet which is positioned over said slot and progressively fold and carry that sheet downwardly entirely through said slot to said folded-sheet delivery position and thereafter to disengage said sheet and return to said inoperative position; work removing means mounted on said frame adjacent said folded-sheet delivery position and operable to receive the folded edge of a folded sheet as it is carried by said work folding means into said delivery position, to grasp and hold said folded edge stationary in said delivery position until said work folding means is disengaged from said folded sheet and thereafter to release said folded edge; and drive means operative, when a flat sheet is fed to the work feeding means, to operate said work feeding, folding and removing means in a coordinated manner to move a flat sheet from the receiving position to the releasing position, and from the releasing position to the delivery position, progressively fold it during the latter movement, hold the folded sheet in the delivery position until the folding mechanism is disengaged therefrom and then release it.

2. The machine of claim 1 including: means frictionally engaging the top face of a sheet to resist the feeding movement thereof, said means cooperating with the work feeding means to stretch-smooth the sheet during the feeding movement.

3. The machine of claim 1 wherein said work removing means comprises: a series of spaced flexible stripper fingers mounted on said frame in position to engage one side of a folded sheet along its fold line when the work folding means reaches the delivery position; and a cooperating latch member pivotally mounted on the frame under the stripper fingers for movement toward the fingers into a latching position in which it cooperates with the fingers to hold the folded edge of the sheet.

4. The machine of claim 3 including: connecting means rendering the drive means operative to swing said cooperating latch member toward and away from said fingers respectively into and out of said latching position.

5. The machine of claim 1 including: anti-flip means mounted on said frame along the path of said downwardly moving folded sheet and operable to restrict the lagging edge of a folded sheet held by said work removing means from being flipped by said work folding means as it is disengaged from said folded sheet.

6. The machine of claim 5 wherein said anti-flip means comprises: a rail pivoted on said frame; and connecting means rendering said drive means operative to swing said rail from its operating position to an out-of-the-way position after the work folding means returns sufficiently to disengage said sheet and to swing said rail to its sheet restricting position before the work folding means returns to its folded sheet delivery position.

7. The machine of claim 1 including: work stacking means mounted on said frame at said folded sheet delivery position to receive a sheet released by the work removing means.

8. The machine of claim 7 wherein said work stacking means comprises: a stack platform on which the sheets are deposited as they are released from the work removing means; means mounting the stack platform for vertical movement; means for moving said stack platform downwardly on said frame as the size of the sheet stack increases; means for latching said downwardly moving stack platform in step-by-step fashion to hold it against upward movement and to maintain the top of the stack at substantially the same level; and a conveyor carried by the said platform in position to receive the sheets released by said work removing means, said conveyor being operative, when actuated, to convey the stack to the point of discharge from the machine.

9. The machine of claim 8 including a stack platform conveyor drive comprising: a friction roller normally spaced below the position assumed by the stack platform when it carries a stack of sheets of predetermined height; means for continuously rotating said friction roller; and manually controlled means for lowering the stack platform into driven engagement with the friction roller to drive said conveyor.

10. The machine of claim 1 wherein the drive means includes: a continuously energized main drive; a secondary drive connected to the work feeding, folding and removing means and operable, when actuated, to effect their coordinated operation on a sheet; means for intermittently connecting the main drive to the secondary drive to actuate the latter, said intermediate connecting means including a clutch having its drive element forming a part of the main drive and its driven element forming a part of the secondary drive and monocyclic control means operative to latch the secondary drive against operation, to unlatch it when a sheet is fed into the work feeding means and thereby institute one complete cycle of sheet feeding, folding and removing operations and to relatch it when it has completed said cycle of operation and is conditioned to begin the next cycle; work stacking means mounted on said frame in position to receive a sheet released by the work removing means and operative to form a stack of sheets upon successive cycles of operation; and stack counting means operative, when a stack of predetermined size is reached, to render said control means inoperative to institute a new cycle of operation by unlatching the secondary drive.

11. The machine of claim 10 wherein said work stacking means includes: means for moving said stack platform downwardly as the size of the sheet stack increases and means for latching the said downwardly moving stack platform in step-by-step fashion to hold it against upward movement and to maintain the top of the stack at substantially the same level; and reset means operable, after a stack of sheets is removed from the machine and the stack platform is unlatched and returned to the position at which it is conditioned to receive the first sheet, to condition said control means for normal operation.

12. A machine for folding flexible sheets such as towels, diapers and the like comprising: a frame having a work surface containing an elongated slot; work folding means mounted on said frame for sheet-delivering and return movements in opposite directions between inoperative and folded-sheet delivery positions respectively spaced above and below said slot and operable, upon moving from its inoperative position, to engage a flat sheet which is located over said slot and progressively fold and carry that sheet downwardly entirely through said slot to said folded-sheet delivery position and thereafter to disengage said sheet and return to said inoperative position; work removing means mounted on said frame adjacent said folded-sheet delivery position and operable to receive and grasp the folded edge of a folded sheet as it is carried by said work folding means into said delivery position, to hold said folded edge stationary in said delivery position until said work folding means is disengaged from said folded sheet and thereafter to release said folded edge; and drive means operative, when a flat sheet is fed to the machine, to operate said work folding and removing means in a coordinated manner to move a flat sheet from a position over the slot to the delivery position, progressively fold it during the latter movement, hold the folded sheet in the delivery position until the work folding means is disengaged from it and then release it.

References Cited in the file of this patent

UNITED STATES PATENTS

| | | |
|---|---|---|
| 326,125 | Kneeland | Sept. 15, 1885 |
| 331,832 | Smith | Dec. 8, 1885 |
| 411,151 | Kneeland | Sept. 17, 1889 |
| 618,016 | Spitzer | Jan. 17, 1899 |
| 1,176,433 | Contessa | Mar. 21, 1916 |
| 1,781,768 | Spiess | Nov. 18, 1930 |
| 1,858,565 | Sokolow et al. | May 17, 1932 |
| 1,990,495 | Neidig | Feb. 12, 1935 |
| 2,082,243 | David et al. | June 1, 1937 |
| 2,204,268 | Brackett | June 11, 1940 |
| 2,403,394 | Preston | July 2, 1946 |
| 2,645,476 | Wood et al. | July 14, 1953 |
| 2,699,936 | Dixon et al. | Jan. 18, 1955 |
| 2,773,585 | Caulfield | Dec. 11, 1956 |